Dec. 12, 1967  R. ROSEBROOK, SR  3,357,309
PROTECTIVE DEVICE FOR TRACER MECHANISM
Filed Nov. 22, 1965
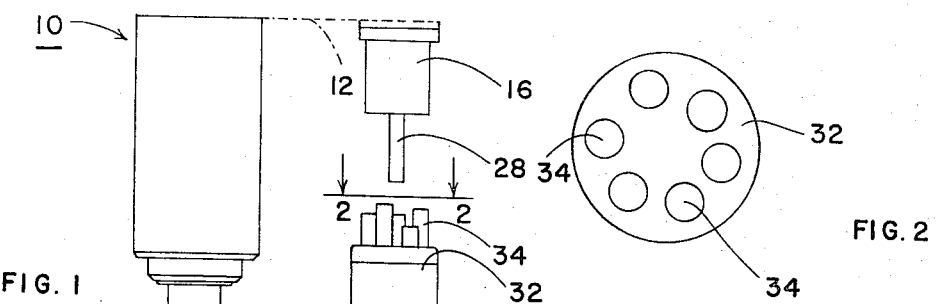
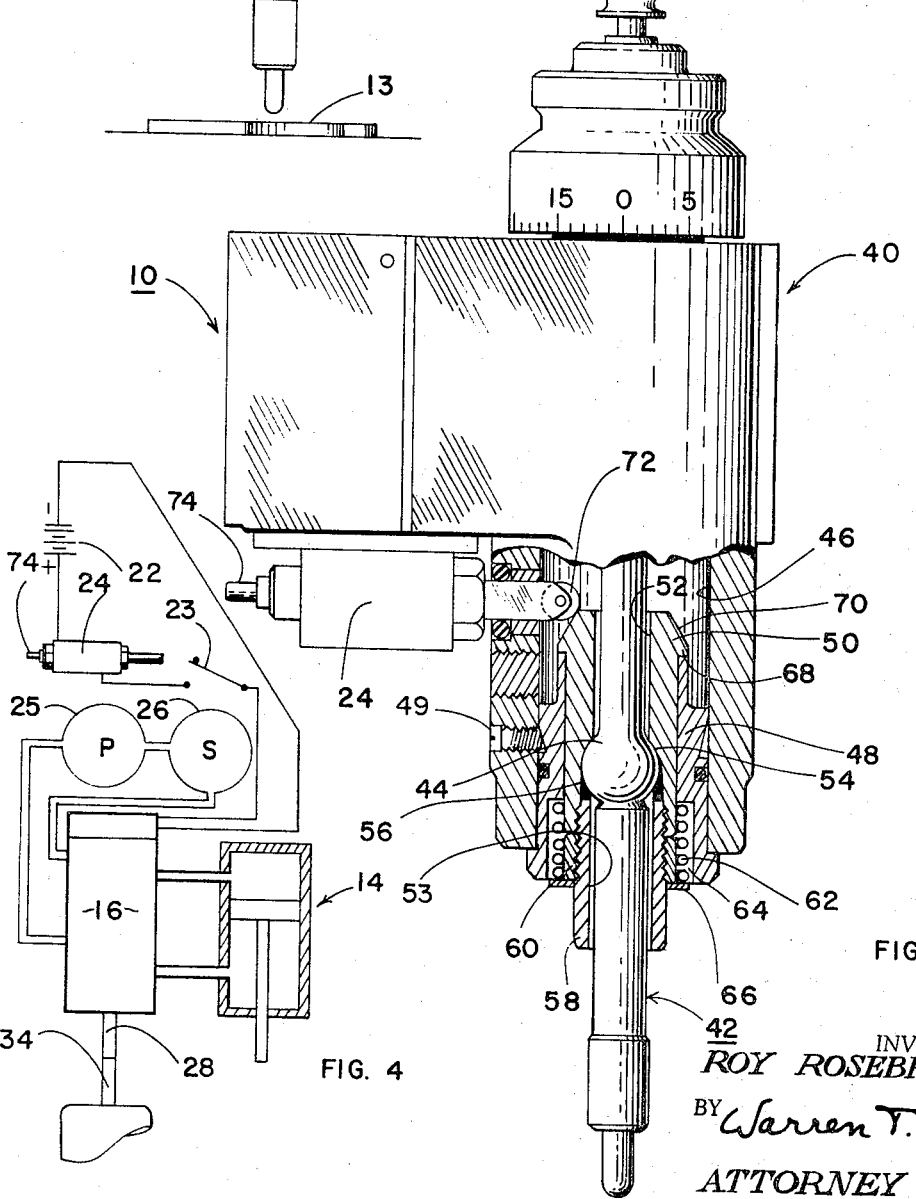
INVENTOR.
ROY ROSEBROOK SR.
BY Warren T. Jessup
ATTORNEY 3,357,309
PROTECTIVE DEVICE FOR TRACER
MECHANISM
Roy Rosebrook, Sr., Downey, Calif., assignor to
Rosebrook, Inc., Downey, Calif., a corporation
of California
Filed Nov. 22, 1965, Ser. No. 509,023
9 Claims. (Cl. 90—62)

This invention relates to tracer mechanisms and more particularly to a tracer mechanism adapted for use with a hydraulically operated machine tool wherein the tracer controls the movement of hydraulic power devices of a machine tool for following the shape of a template pattern.

Pattern tracing devices for both two and three dimension tracing serve to control drive mechanism which operates machine tool cutting, and similar operations. One such pattern tracing mechanism has a stylus mandrel with a longitudinal axis, which mandrel is mounted for universal movement about its axis. The stylus operates piston-type valves which control the flow of fluid to operate power pistons. The tracing mechanism is either mounted directly to the carriage of the machine tool or is mounted to operate conjointly therewith.

Such pattern tracing mechanism is advanced toward the pattern at the beginning of a work cycle after a workpiece has been mounted on the associated machine tool. Although it is possible to control the advance of the tracing stylus to the pattern by manual means, it is common practice to provide a control device which may be pre-set, and will cause the advance movement of the tracer to halt and remain fixed in a work position after the control device reaches a preselected condition.

However, if a control device is employed in such manner, it is unable to detect the presence of a foreign object which might intercept the stylus of the tracer as it advances, and will continue to supply advancing power after the stylus can no longer advance. Heavy damage then results. Furthermore, human error may cause a wrong setting, and therefore direct the continued application of power after the stylus has reached the support table of a pattern.

Accordingly, it is an object of this invention to provide sensing apparatus associated with the tracer, to sense the occurrence of excess pressure upon the tracer stylus, and to overrule the command of forward movement supplied by a control device.

It is a further object of this invention to provide a carriage for the stylus of a tracer device, which carriage may be caused to telescope within the tracer housing and operate a reversing control upon the advent of the carriage moving to a preselected degree.

Another object of the invention is to provide a separate control means which is solenoid operated to put the control means into condition for causing the advance of the tracer, and is moved conjointly with the tracer, but has a mechanically operated probe for contact against a preset drum stop, which contact will cause the control means to bring the tracer to a halt in its service tracing position, and sensing apparatus associated with the tracer is placed in overriding control of the control means and will force the control means to completely reverse and withdraw the tracer apparatus upon the advent of excess stylus pressure on the tracer mechanism.

In accordance with these and other objects which will become apparent hereinafter, the best mode contemplated for the present invention is disclosed in the accompanying drawings wherein:

FIG. 1 is a schematic illustration of a tracer device and control device with means for moving the devices conjointly;

FIG. 2 is a top plan view of a turret abutment device as taken along the line 2—2 of FIG. 1;

FIG. 3 is an elevation view, with parts broken away to reveal interior construction, of a tracer mechanism embodying the features of this invention; and FIG. 4 is a schematic layout of the control apparatus of this invention.

Referring now to the drawing, the FIG. 1 is a schematic relationship illustration of a tracer 10 of the type which is carried conjointly with a carriage 12 of a machine tool provided to advance and retract the tracer and to carry the tracer along the surface of a pattern. Such pattern is suggested in the FIG. 1 by the profile view of a pattern 13.

A tracer is generally employed with hydraulically operated machine tools, and most commonly is employed with power means of two reciprocating hydraulic differential motors for two-dimensional work, or more such motors for three-dimensional work. Because this invention is not related to any particular tracer control, one hydraulic motor power means is indicated in FIG. 4 by the reference character 14.

Although it is possible to advance and retract tracer 10 to pattern 13 by manual control, a control system involving a control device 16 as shown only in FIGS. 1 and 4 is preferable.

Control 16 is essentially a valve for directing the power fluid to motor 14, and is caused to move through a path simulating the actual path of the tracer itself.

In principle, the control 16 is so constructed internally that a control operation by the operator, to begin tracer action, will cause the valve structure within the control 16 to route the fluid under pressure to the motor 14 in the direction to cause the carriage 12 to move the tracer toward the pattern and also to cause the control 16 itself to move through the path which simulates the path of the tracer. The advance movement continues after such operator initiated control, until the control 16 reaches a stop position where it is influenced to cause the valve structure within the control 16 to change to a neutral position. In such neutral position, fluid is blocked from all flow in order to hold the motor 14 at the position where it is located whenever the tracer reaches this position.

In order to reverse the cycle, the control 16 must be acted upon in such manner that the valve structure within the control is moved to reverse the flow of fluid to the motor and cause the motor to move in the opposite direction. This reverse movement is achieved in the environment of the present invention by some means outside of the actual control 16. In the context of this invention such outside control is the removal of the influence which the operator placed upon the control to begin the operation and the reaction of the valve mechanism within the control under a spring urging means which it contains.

More specifically, the control 16 is embodied in the form of a hydraulic spool valve wherein springs are so tuned and balanced that the spool valve normally moves to a position wherein the fluid is directed to the motor 14 to cause the motor to retract. In order to advance the motor, a solenoid is employed to overcome the balance and tuning of the spring within the control and move the spool valve to a position wherein the fluid is caused to flow to the motor in a manner which will cause the motor to advance the carriage 12. This solenoid is under the control of the operator and it is that control which the operator uses initially to start the operation.

In a well known spool valve control construction, the solenoid neutralizes the spring action which tends to retract the spool. The valve may then be lifted easily by outside influence to the neutral position to cause a motor "hold" condition, or even beyond to cause a motor reversal. Whenever the solenoid is de-energized, the normal retract condition will obtain.

A source of power, suggested by the battery 22, is electrically connected in series with a manually operable switch 23, and a re-settable limit switch 24 to operate the solenoid 20. A pump 25 and a sump 26 are connected to suitable delivery conduits through the control 16 to the motor 14.

The control 16 is caused to move through a path, advancing and retracting within that path conjointly with the tracer 10. Such movement may be provided by supporting the control device 16 directly upon the carriage which supports the tracer 10, or may be supported by apparatus which moves conjointly therewith but at a ratio of distance and speed with respect to the tracer. It is required that the control device have a movement which bears a direct relationship to the movement of the tracer 10, but the distance of movement need not be identical. The control device moves between a retracted position when the tracer is withdrawn, and an advance terminal position which is dictated by the limit of the motor 14 which operates the tracer carriage 12.

However, in normal use, the carriage 12 is not permitted to advance to its full capacity. A probe 28 is carried by the control 16 and projects forward of the control in the path of movement. Therefore, by putting an abutment in the path of the probe 28, the probe will contact the abutment and cause the related parts of the control 16 to move to the neutral position, wherein the motor 14 can move in neither direction, the forward advance of the carriage 12 will come to a halt, and hence the control device 16 will stop with the control parts thereof in their position holding relationship.

Note that the stops, rather than the control 16, may be moved conjointly with the tracer to accomplish the relative control movement. In order to provide the degree of advance for control 16 which is desired, a limit abutment is provided in the form of a drum stop turret 32, as shown in FIGS. 1 and 2, having a plurality of vertical stops 34. The stops 34 are located in a common circle on the drum turret, and each pin projects to an elevation above the drum surface as predetermined by the operator, to establish the particular degree of advance movement desired for the tracer 10. Thus, the operator may rotate the drum turret 32 to select the proper stop 34 for abutment by the probe 28. Solenoid 20 acts as a work cycle initiating means for moving the control device parts into relationship for causing said power means to advance the tracer and control device, but the various stops 34 act as a limit means positionable in the path of the control device for altering the relationship of the control device parts to the holding control action relationship upon the event of the control device reaching the position of the pins 34.

In the FIG. 3 of the drawing, a tracer of well known and accepted design is indicated by the reference character 40. The tracer 40 may be referred to as a tracer body in the context of the invention shown in the drawing.

A stylus spindle 42 is formed with a fulcrum 44, and is rod-like with the fulcrum about midway of its length. Fulcrum 44 has spherical surfaces as shown in FIG. 3, to act as a pivot support for the spindle.

The tracer body 40 has a barrel cylinder 46 opening downwardly in the normal position of tracer use. The spindle projects up into the barrel, and pivots about the fulcrum 44 for control action.

To support the spindle, a guide 48 is secured in the barrel cylinder 46 by means of set screw 49. A carriage 50 is mounted in the guide 48 for longitudinal movement along the axis of the barrel cylinder 46. Thus, the carriage 50 is supported for longitudinal movement in the barrel 46 a distance from the side walls of the barrel by means of the guide sleeve.

The carriage has a longitudinal bore through its central axis, along the central axis of the barrel 46. A bore 53 opens from the top end of the carriage 50, and a bore 53 opens from the opposite end. The bore 53 is larger than the bore 52, and a spherical shoulder 54 joins the two bores and serves as a pivot surface against which the spherical surfaces of the fulcrum 44 abut.

Then, to hold the fulcrum 44 within the carriage, but free to swing in the clearance provided by the through bores 52 and 53, an insert shoulder 56 is located in the large bore 53 as a counter part of spherical shoulder 54, and is supported by a threaded retainer 58. Retainer 58 is a part of the carriage, and the bore 53 is a bore through this retainer. The retainer 58 will provide the desired degree of snug fit of insert 56 to the fulcrum 44 within the carriage.

The carriage is urged out of the guide 48 by means of a spring 62 which entwines the retainer 58 of the carriage, and is carried within recess 64 of the carriage guide 48. The spring acts upon carriage 50 by means of spring retainer 66 carried by the retainer 58.

Therefore, the spring 62 urges the carriage 50 to move out of the sleeve 48, and the carriage is provided with overhanging shoulder 56 at the top end thereof to abut the top of guide 48 and limit the degree of outward movement.

In normal operation, the spindle 42 will pivot about the fulcrum 44 and operate valving within the top portion of the body 40 for the normal use of the tracer apparatus.

However, should the operator fail to set the proper stops 34 on the drum 32 beneath the probe 28, or in the event the pattern is misplaced or some foreign object is carelessly allowed to remain on the pattern or pattern table, the stylus end of spindle 42 may contact an obstruction before the probe 28 is caused to move the control device 16 into the holding position. In such event, the control 16 permits fluid under high pressure to continue to the motor 14. Because the motor 14 is usually very powerful, if the obstruction is solid, a considerable damage will result to the tracer and stylus.

Accordingly, this invention provides a cam surface 70 on the top of the carriage 50, and a cam follower 72 on the end of switch 24. Cam surface 72 is a frustrum of a cone, sloping inwardly from carriage shoulder 68 toward the longitudinal axis of the barrel 46. The cam follower 72 is a wheel and is positioned to ride the surface 70. Hence, vertical movement of the carriage 50 with respect to the barrel 46, will cause a lateral component of force to act through the arm supporting the follower 72, and hence will actuate the switch 24.

Switch 24 is a normally closed switch, and therefore when placed in the circuit shown in FIG. 4, will complete the series circuit to the solenoid 20 whenever switch 24 is closed. The switch 24 is normally not required to break the circuit except whenever the stylus does meet with the undesired resistance, causing the carriage to move upwardly against the force of the spring 62. However, manual lifting of the stylus 42 can be employed to end a tracing cycle if desired. Opening switch 23 will likewise cause such reversal.

The switch 24 is of the resetting type and has a manually operable button 74 for such resetting action.

It will be recognized that the manner of carrying the control device 16, and the form and operation of the control device 16 and its electrical components, is subject to discretion of a machine tool designer, and may be altered within wide limits to accomplish the functions set forth herein for teaching of the inventive concept.

Whereas the invention has been shown and described herein in what is conceived to be the best mode contemplated, it is recognized that departures may be made therefrom within the scope of the invention which is therefore not to be limited to the details disclosed herein but is to be afforded the full scope of the invention as hereinafter claimed.

What is claimed is:

1. In a pattern tracing mechanism of the type having a stylus with a longitudinal axis, which stylus is mounted for universal movement within a housing and having control devices operable in response to movement of said stylus for operation of a power drive carriage supporting said tracing mechanism, the provision of:

means mounting said stylus for tracing, and reverse control means operable in response to a selected degree of force upon said stylus for causing said power-driven carriage to withdraw said tracer and stylus, whereby excessive end pressure on said tracing mechanism is prevented.

2. In a pattern tracing mechanism as defined in claim 1;
   said means mounting said stylus being a reciprocable carriage; and
   a switch in a reverse control system mounted for actuation by carriage retraction movement.

3. In a pattern tracing mechanism as defined in claim 1;
   said means mounting said stylus being a vertically slidable bushing carried by said tracing mechanism with a spindle extending through the bushing and pivotally supported therein; and
   a switch of said control means having a cam follower arm projecting into the path of said bushing for actuation by contact of the bushing in vertical movement.

4. In a machine tool having a pattern tracer, and power means for operating said tracer in a path between an inactive storage position and a work position, and position control means for establishing an advance of said tracer to a work position with respect to a pattern support, the provision of an overriding control in said tracer to sense an excessive abutment pressure of said tracer against an object and to reverse said power means, comprising:
   a tracer mechanism including a stylus projecting therefrom to follow the edge of a pattern;
   a stylus carriage;
   a pivot mount supporting said stylus on said stylus carriage for lateral swing movement about said pivot mount in tracing operation, track means mounting said carriage on said tracer and providing relative movement of said tracer and stylus in a direction to allow said stylus to halt against an obstruction as said tracer advances; and
   means responsive to relative movement of said stylus carriage with respect to said tracer mechanism for reversing said power means and returning said tracer to said storage position.

5. In an override control as defined in claim 4;
   said position control means being separate from said tracer, and movable in a path of movement related to the movement of said tracer, for contacting a stop placed in said path and bringing said tracer to a halt; and
   said means operable in response to movement of said stylus carriage being an electrical switch in a power circuit, wherein actuation of the switch activates said position control means to reverse the power means.

6. In a machine tool having a pattern tracer, and power means for operating said tracer in a path between an inactive storage position and a work position, the provision of a control system for said power means, comprising:
   a control device having related parts thereof providing an advance control action, a position holding control action, and retract control action upon said power means according to relationship in which the parts are caused to associate;
   means for moving said control device through a path conjointly with said tracer between a retracted position and an advance terminal position;
   work cycle initiating means for moving said control device parts into relationship for causing said power means to advance said tracer and control device;
   limit means positionable in said path of the control device for altering the relationship of said control device parts to said holding control action relationship upon said control device reaching the position of said limit means;
   said tracer including a stylus and a stylus carriage, a pivotal mount supporting said stylus on said carriage for lateral swing movement of the stylus about said mount in tracing operation, said stylus fixed to said carriage against relative longitudinal movement with respect to said carriage whereby said carriage and stylus are movable as a unit, and means mounting said carriage on said tracer for yieldable movement under pressure loading; and
   means responsive to relative movement of said stylus carriage and tracer support body for moving the control device parts to said retract relationship, whereby the power means is caused to reverse and release the stylus abutment contact pressure.

7. In a control system as defined in claim 6;
   said work cycle initiating means being an electrical solenoid, and said means for moving the control device parts to said retract relationship being a cut-off switch in a power supply to said solenoid.

8. In a control system as defined in claim 6;
   said power means being a hydraulic differential motor;
   said control device being a spool valve with an electrical solenoid for driving the valve to the advance motor position to initiate advance of the tracer and control device; and
   said limit means being a mechanical probe carried by the spool of the valve and extending from said valve in the direction of movement of the control device, and a mechanical stop in the path of said probe, whereby the interior spool will be brought to a halt upon contact of the probe and stop, and thus produce a relative valve movement as the device moves forward with respect to the stop after such contact.

9. In a control system as defined in claim 6;
   said power means being a hydraulic differential motor;
   said control device being a spool valve with an electrical solenoid for driving the valve to the advance motor position to initiate advance of the tracer and control device;
   said limit means being a mechanical probe carried by the spool of the valve and extending from said valve in the direction of movement of the control device, and a mechanical stop in the path of said probe, whereby the interior spool will be brought to a halt upon contact of the probe and stop, and thus produce a relative valve movement as the device moves forward with respect to the stop after such contact; and
   said means responsive to relative movement being an electrical switch in a power circuit, wherein actuation of the switch activates said position control means to reverse the power means.

No references cited.

GERALD A. DOST, *Primary Examiner.*